United States Patent
Mandalia et al.

(10) Patent No.: US 8,495,139 B2
(45) Date of Patent: Jul. 23, 2013

(54) AUTOMATIC SCHEDULING AND ESTABLISHMENT OF CONFERENCES

(75) Inventors: Baiju D. Mandalia, Boca Raton, FL (US); Joseph G. Rusnak, Durham, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2542 days.

(21) Appl. No.: 11/198,536

(22) Filed: Aug. 5, 2005

(65) Prior Publication Data

US 2007/0033251 A1    Feb. 8, 2007

(51) Int. Cl.
    *G06F 15/16*      (2006.01)

(52) U.S. Cl.
    USPC .......................................... 709/204; 709/203

(58) Field of Classification Search
    USPC .................................................. 709/203, 204
    See application file for complete search history.

(56) References Cited

U.S. PATENT DOCUMENTS

| | | | |
|---|---|---|---|
| 6,222,536 B1 | 4/2001 | Kihl et al. | |
| 6,385,652 B1 | 5/2002 | Brown et al. | |
| 6,519,576 B1 | 2/2003 | Freeman | |
| 6,721,783 B1 | 4/2004 | Blossman et al. | |
| 7,467,190 B2 * | 12/2008 | Matsubara et al. | 709/219 |
| 2001/0007332 A1 | 7/2001 | Kjonaas et al. | |
| 2001/0056401 A1 | 12/2001 | Tompkins | |
| 2002/0188565 A1 | 12/2002 | Nakamura et al. | |
| 2002/0188674 A1 | 12/2002 | Brown et al. | |
| 2003/0097331 A1 | 5/2003 | Cohen | |
| 2003/0101116 A1 | 5/2003 | Rosko et al. | |
| 2005/0018826 A1 * | 1/2005 | Benco et al. | 379/202.01 |
| 2006/0045029 A1 * | 3/2006 | Ethier et al. | 370/260 |

\* cited by examiner

*Primary Examiner* — Duyen Doan
(74) *Attorney, Agent, or Firm* — Cuenot, Forsythe & Kim, LLC

(57) ABSTRACT

A method of automatically conducting a conference can include determining availability for each of a plurality of conference participants and selecting a date and time for the conference based upon the availability of each of the plurality of conference participants. The method further can include automatically initiating the conference among the conference participants on the date and at approximately the time for the conference.

20 Claims, 2 Drawing Sheets

AUTOMATIC SCHEDULING AND ESTABLISHMENT OF CONFERENCES

BACKGROUND

1. Field of the Invention

The present invention relates to automatically scheduling and establishing conferences.

2. Description of the Related Art

Communication technology is advancing at a rapid pace. One notable advance has been the convergence of voice and data communications. To some degree, both voice and data now can be carried over a single network. Convergence has lead to the development of unified systems which are capable of sending and receiving messages over a variety of different communication channels, referring to the different types of messages that can be exchanged such as electronic mails, pages, facsimiles, instant messages, telephone calls, Short Message Service (SMS) messages, and the like. For example, when a sending user attempts to contact a target individual, a message from the sender can be transmitted over one or more of these communication channels.

Within such messaging systems, a communication channel often is selected according to a profile associated with the target user. For example, a profile can specify that messages sent through the messaging system to the target user should be forwarded as electronic mails on Mondays or as facsimiles on Tuesdays. One can see that the flexibility afforded by such messaging systems can significantly increase the effectiveness of communications within an organization.

To date, however, these capabilities have not been successfully integrated into the routine business practices of most organizations. Conventional messaging systems have not been used within organizations in a proactive manner which complements or supports business functions. Accordingly, it would be beneficial to provide a system which actively supports and fosters business processes within an organization.

SUMMARY OF THE INVENTION

The present invention provides a solution for automatically scheduling and establishing a multi-party conference. One embodiment of the present invention can include a method of automatically conducting a conference. The method can include determining availability for each of a plurality of conference participants and selecting a date and time for the conference based upon the availability of each of the plurality of conference participants. The method further can include automatically initiating the conference among the conference participants on the date and at approximately the time for the conference.

Another embodiment of the present invention can include a method of automatically conducting a conference. The method can include determining availability for each of a plurality of conference participants and selecting a date and time for the conference based upon the availability of each of the plurality of conference participants. On the date and at approximately the time for the conference, a communication session can be automatically established with each of the plurality of conference participants. Each individual communication session then can be joined to form the conference.

Other embodiments of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a method and apparatus for automatically scheduling and establishing a conference. As used herein, a conference can refer to a real time, or near-real time, communication session involving more than two participants. Examples can include a conference call, a World Wide Web (Web) based conference, a videoconference, and/or a multi-party instant messaging (IM) session. In accordance with the inventive arrangements disclosed herein, the availability of potential conference participants can be determined through any of a variety of different techniques. Once availability is determined, a conference can be scheduled for the various participants at a date and time that is mutually acceptable. When the scheduled conference arises, the participants can be contacted automatically and then joined into the conference, or can be notified via a selected communication channel.

Figure 1:
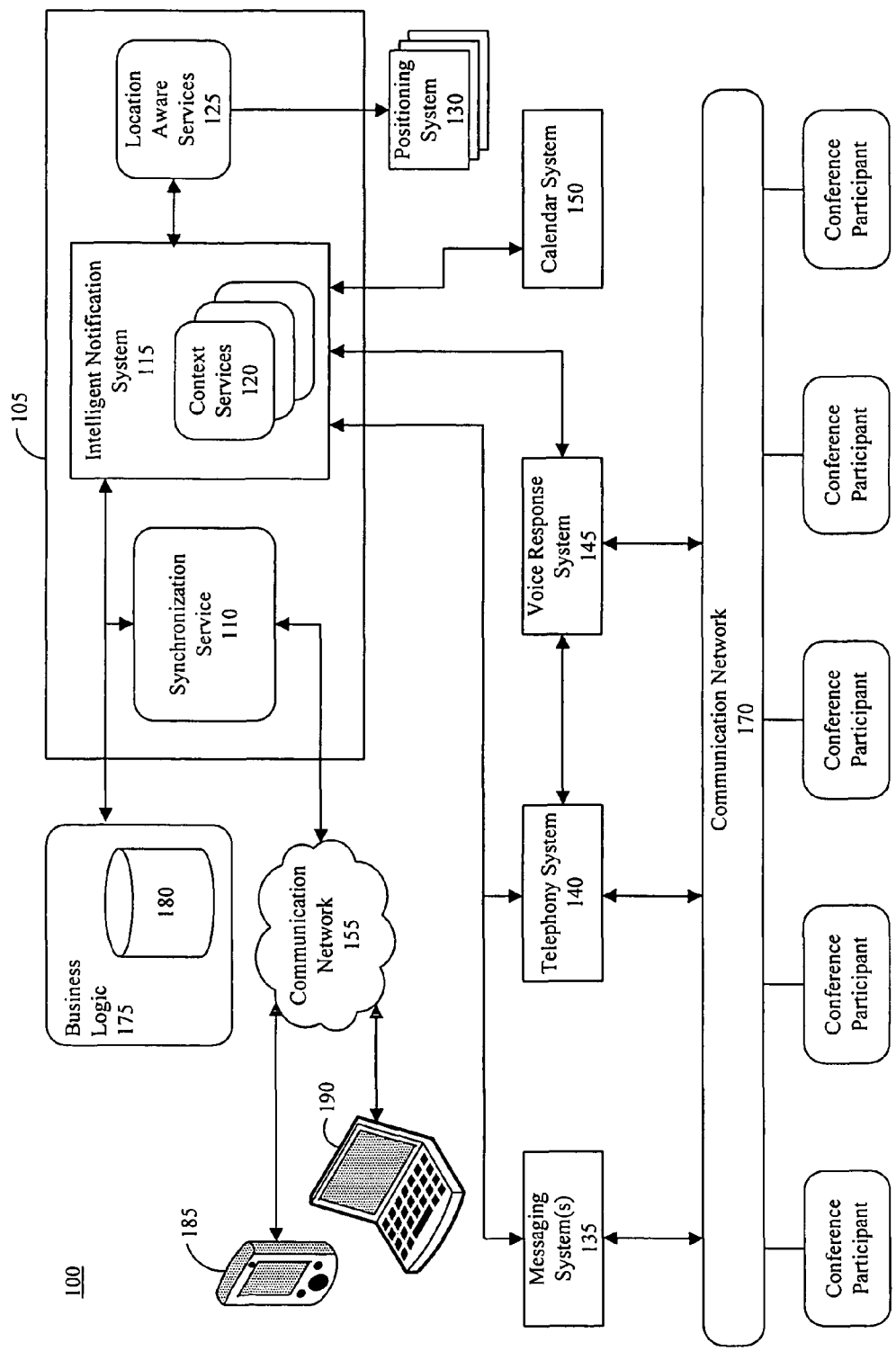
FIG. 1 is a block diagram illustrating a conference system configured in accordance with one embodiment of the present invention.

FIG. 1 is a block diagram illustrating a conference system 100 in accordance with one embodiment of the present invention. The conference system 100 can include an on-demand computing environment (computing environment) 105 for providing applications to mobile users. Computing environment 105 can be configured as a middleware platform that provides an integrated client-server environment and application development tools to extend business applications and data to mobile devices. Computing environment 105 provides the back-end integration framework necessary for providing functions including, but not limited to, mobile personal information management (PIM), electronic mail synchronization, and access to Web-based and other content.

In one embodiment, the computing environment 105 can be implemented as WebSphere® Everyplace Access, which is commercially available from International Business Machines Corporation of Armonk, N.Y. (IBM). WebSphere® Everyplace Access is described in greater detail in the following publications, which are incorporated herein by reference: IBM WebSphere Everyplace Access V5 Handbook for Developers and Administrators, Volume IV: Advanced Topics, IBM (March 2005); IBM WebSphere Everyplace Access V5 Handbook for Developers and Administrators, Volume II: Application Development, IBM (March 2005); and Adding Voice to your Portlet Applications, IBM (July 2004). In any case, the use of a particular computing environment 105 is not intended to limit the scope of the present invention.

The computing environment 105 can include a synchronization service 110, an intelligent notification system (INS) 115, and location aware services 125. The synchronization service 110 can be implemented as a scalable solution for synchronizing PIM data between mobile devices 185 and 190 and various servers and/or databases, including data store 180 disposed within business logic 175. In one embodiment, for example, where the computing environment 105 is implemented as WebSphere® Everyplace Access, the synchronization service 110 can be provided as a standard component of the computing environment 105. In any case, the synchronization service 110 can be configured to synchronize data simultaneously between multiple sources and/or databases.

In general, the INS 115 collects context information from any of a plurality of different sources. This allows enterprises to send messages to mobile users to improve information flow and business efficiency. Context services 120 are disposed within the INS 115. The context services 120 can acquire and analyze context information relating to the availability of personal representatives (users) and make this information available to the INS 115 and other components that may have a need to use such information.

As used herein, context information can include, but is not limited to, information relating to one or more individuals as may be acquired from any combination of location aware services 125, a calendar system 150, positioning systems 130, telephony system 140, which can be implemented as an Internet Protocol (IP) telephony system, and one or more other messaging systems 135, which can include, but are not limited to instant messaging (IM) systems, electronic mail systems, Short Message Service (SMS) systems, including Wireless Application Protocol (WAP) based systems, Web-based conferencing systems, videoconferencing systems, and the like. The context services 120 can be configured to communicate with presence servers through appropriate communication protocols such as SIP for IM and Presence Leveraging Extensions (SIMPLE) for communication with an IM system presence server, Parlay for communicating with a telephony system 140 presence server, and the like.

Still, it should be appreciated that the listing of systems from which context information can be obtained is not intended to be exhaustive. As such, the list serves only as an example of some of the different types of systems that can be used in conjunction with the INS 115 and from which context information can be obtained for purposes of determining availability of an individual. For example, other means of determining context information can include, but are not limited to, providing a network-connected application that representatives can use to manually toggle availability from available to not available similar to an IM system. Workstation agents can be used which detect activity on the workstation and the type of activity that is taking place on the workstation such as the particular application being used, whether a Web conference is ongoing, and the like. Motion and/or sound detectors can provide context information. Other examples of context information can be found within J. Fogarty and S. Hudson, *Examining the Robustness of Sensor-Based Statistical Models of Human Interruptibility*, CHI 2004, Apr. 24-29, 2004, Vienna, Austria, which is incorporated herein by reference.

In any case, the INS 120 can interact with different messaging systems. The INS 115 can instruct the various messaging systems to send messages, interpret user response data received from the messaging systems, as well as implement the communications capabilities between these systems and the location aware services 130. For example, a context service 120 can be provided which polls one of the message systems 135, which in this case can be an IM system, to determine whether a particular user is logged onto the message system 135. The context service 125 further can be tasked with communicating with the IM system to command the IM system to send a communication, i.e. an instant message, as well as interpret data received from the IM system such as user responses.

In another example, a context service 120 can be provided which can query the calendar system 150. The context service 120 can be configured to interact with the calendar system 150 to obtain scheduling information for selected user(s). The calendar system 150 can maintain scheduling data relating to various users, particularly the conference participants. One context service 120, for example, can be configured to interact with the calendar system 150 to obtain scheduling information for selected user(s) and determine one or more days and times during which the selected users are available to participate in a conference.

In yet another example, the INS 115 can interact with the voice response system 145 and instruct it to perform various functions. Voice response system 145 can perform functions such as placing telephone calls and conducting dialogs with a call recipient. Accordingly, the voice response system 145 can provide functions including, but not limited to, executing applications such as Voice Extensible Markup Language (VoiceXML) applications, playing recorded prompts, prompting users through text-to-speech technology, speech recognizing user spoken utterances, and recognizing dual tone multi-frequency (DTMF) input. These capabilities can be used to supply interactive voice response functions for telephone calls conducted over telephony system 140.

In one embodiment, the voice response system 145 can be implemented as, or include, WebSphere® Voice Response, WebSphere® Voice Application Access, and WebSphere® Voice Server, each being available from IBM. WebSphere® Voice response provides telephony connectivity to WebSphere® voice applications, which can be executed therein. WebSphere® Voice Server provides text-to-speech functionality and automatic speech recognition functions. WebSphere® Voice Application Access provides rendering of voice to WebSphere® Portal applications thereby voice-enabling portlets if included within the system.

Through the INS 115, users can subscribe to services or events and receive timely, personalized alerts for the services and/or events for which the users have subscribed. The various systems in communication with the INS 115 can post events and/or messages to the INS 115. When an event is posted, the INS 115 performs one or more programmatic actions. For example, the users of a particular group or division within an organization can subscribe to a given event. When an event or message is posted to the INS 115, a notification can be distributed to the users that have subscribed to that event. The notification can be distributed through one or more communication channels, for example via the messaging systems 135 and/or the telephony system 140, as will be described herein in greater detail.

Thus, the INS 115 and/or the context services 120 can be configured to perform a variety of different functions relating to context information. Other examples of functions which can be performed by the INS 115 can include collecting, maintaining, and disseminating context information as disclosed in U.S. Patent Publication No. 2003/0018692 entitled "Method and Apparatus for Providing a Flexible and Scalable Context Service"; providing context-aware unified communication for enabling communications between users over a common communications platform or heterogeneous communication platforms as disclosed in U.S. Patent Publication No. 2004/0203664 entitled "System and Method for Context-Aware Unified Communications"; as well as fuse context data for use by context aware applications as disclosed by U.S. Patent Publication No. 2004/0111397 entitled "Method and Apparatus for Fusing Context Data". Each of these patent publications is incorporated herein by reference.

Location aware services 125 provide a framework for integrating real time location information into communications and business applications. Location information is another variety of context information as described herein. In one embodiment, the location aware services 125 provide the functionality and/or interfaces necessary for interacting with various positioning systems 130. Each location aware service 125 can be tasked with communicating with a particular positioning system 130 to obtain location information for one or more selected users. The positioning systems 130 can include, but are not limited to, short range wireless location tracking systems such as those based upon one of the 802.11 wireless communication protocols, Global Positioning Systems, and the like. In any case, the location aware services 125 can communicate with the various positioning systems 130 to determine whether a particular user, or more particularly mobile user device, is locatable, and if so, the location for that device and corresponding user.

Location aware services 125 also can be organized at a higher level. For example, the location aware services 125 can include services such as geocoding in reference to determining geographical coordinates for an address received as input, reverse geocoding, directory services where points of interest are located proximate to a given location, routing in reference to determining physical directions from one location to another, mapping which provides a map of a designated location, and device positioning which returns a location of a user's device.

Business logic 175 can be implemented as a collection of one or more software applications which implement various business processes and/or functions. Data required by the business logic 175 can be stored within data store 180, for example within a database or other suitable data structure. It should be appreciated, however, that data also can be obtained from, or maintained by, an outside data source. In any case, the various capabilities described herein with respect to presence detection, messaging, and calendaring can be accessed by the business logic 175 via the INS 115 and/or the synchronization service 110.

The scheduling of a conference can be invoked by one or more different events. In one embodiment, the event can be a user request to schedule a conference. The user request can specify the conference participants. The user request, for example, can originate from within the business logic 175, a client of the calendar system 150, or another communication system, and be relayed to the INS 115 for processing. In another embodiment, the event can be the posting of a particular data item to the data store 180. A data item, such as an electronic document, can be posted to the data store 180 using any of a variety of different mechanisms.

In illustration, users can post data to data store 180 via one or more workstations (not shown). Users also can upload data to the synchronization service 110, from mobile device 185 and/or 190 through communications network 155. Communication networks 155 and 170 can include the Internet, the Web, Local Area Networks, Wide Area Networks, the Public Switched Telephone Network, wireless networks whether mobile and/or cellular networks as well as shorter-range wireless networks such as 802.11 type networks, Bluetooth type networks, and the like. Though networks 155 and 170 are shown as two separate and distinct networks, it should be appreciated that the two can be joined or function as a single larger network. In any case, the particular network architecture used is not intended as a limitation of the present invention. The synchronization service 110, in turn, can update data store 180 with the data.

The business logic 175 can detect the updating and/or posting of the electronic document to the data store 180 by the synchronization service 110. Accordingly, the business logic 175 can post an event to the INS 115. Alternatively, the synchronization service 110 can post an event to the INS 115 responsive to updating the data store 180. Any persons that have subscribed to the event can be identified and/or notified. The subscribers can be those users that have an interest in the posted and/or updated document. The users that have subscribed to that event, for example, can be potential conference participants.

Thus, if an electronic document from a particular user, having a particular name, or some other specified attribute is posted to the data store 180, a corresponding event can be posted to the INS 115. This causes the INS 115 to initiate the sending of one or more notifications to users that have subscribed to that event. Accordingly, users in a particular workgroup, having subscribed to a common event within the INS 115, can receive a notification indicating that a particular report, for example, has been posted or updated to the data store 180. The notifications can be sent via any of a variety of different communication channels, whether IM, electronic mail, automated voice response system over a telephone call, SMS, or the like.

The posting of data to the data store 180 also can trigger the automatic scheduling of a conference. For example, the business logic 175 or the synchronization service 110, as the case may be, can be configured to post an event to the INS 115 when a document is posted to, or updated within, the data store 180. Responsive to receiving the event, the INS 115 can initiate the automatic scheduling of a conference. The INS 115 can automatically initiate the conference between the concerned parties when the appropriate date and time arises.

In scheduling the conference, the INS 115, via a context service 120, can access the various electronic calendars of the conference participants in calendar system 150. The context service 120 can select a date and time for which each of the participants is available and has no scheduling conflict as specified by the calendar system 150. The INS 115 can schedule the conference for that date and time. In one embodiment, where the conference will be a conference call, when the date and time for the conference arises, the INS 115 can instruct the voice response system 145 to begin placing outgoing telephone calls via telephony system 140 to each of the conference participants. The INS 115 then can instruct the telephony system 140 to join the individual calls into a single conference call.

It should be appreciated that the telephony system 140 can be implemented as a conventional telephony switching system, an Internet Protocol (IP) based system, or as a combination of the two. As such, calls can be placed using the telephony system 140 in cooperation with the voice response system 145. The telephony system 140 further can include one or more switching systems, including softswitches, which can handle streaming audio and/or video as well as switching such data streams between various termination points. This allows persons to participate in a conference via a suitable IP device, whether a telephone and/or a video and audio capable device. Notwithstanding, users of conventional telephony equipment still can be contacted and included in the communication session.

If the conference is implemented as a multi-party IM session, the INS 115 can instruct the IM system to establish IM sessions with the various conference participants. The IM sessions can be joined to form a multi-party IM session such that each conference participant can communicate with each other participant via IMs. For participants that are not logged into the IM system at the time of the conference, the INS 115 can send a notification via another communication channel, such as an SMS or voice message, which reminds the participant to login to the IM system so that he or she can be invited to join the conference. If, however, a Web-based conference is to be established, the INS 115 can cause notifications to be sent to the various conference participants on the date and at about the time of the conference to remind each conference participant of the scheduled conference. In this embodiment, each conference participant logs into the Web-conference independently. The notification, if implemented as an IM or an electronic mail, can provide a link to the Web-conference. A similar process can be undertaken with respect to video-conferencing.

It should be appreciated that the reminder functionality described above can be used despite the particular type of conference to be held. In illustration, if the conference is a conference call and one or more participants are not logged onto the telephone system 140 at the time of the conference call, the INS 115 can cause a notification to be sent to the participants reminding each participant that is not logged onto the telephone system 140 to logon to participate in the conference call. The notification can be an IM, an SMS message, an electronic mail, or an automated phone call.

Figure 2:
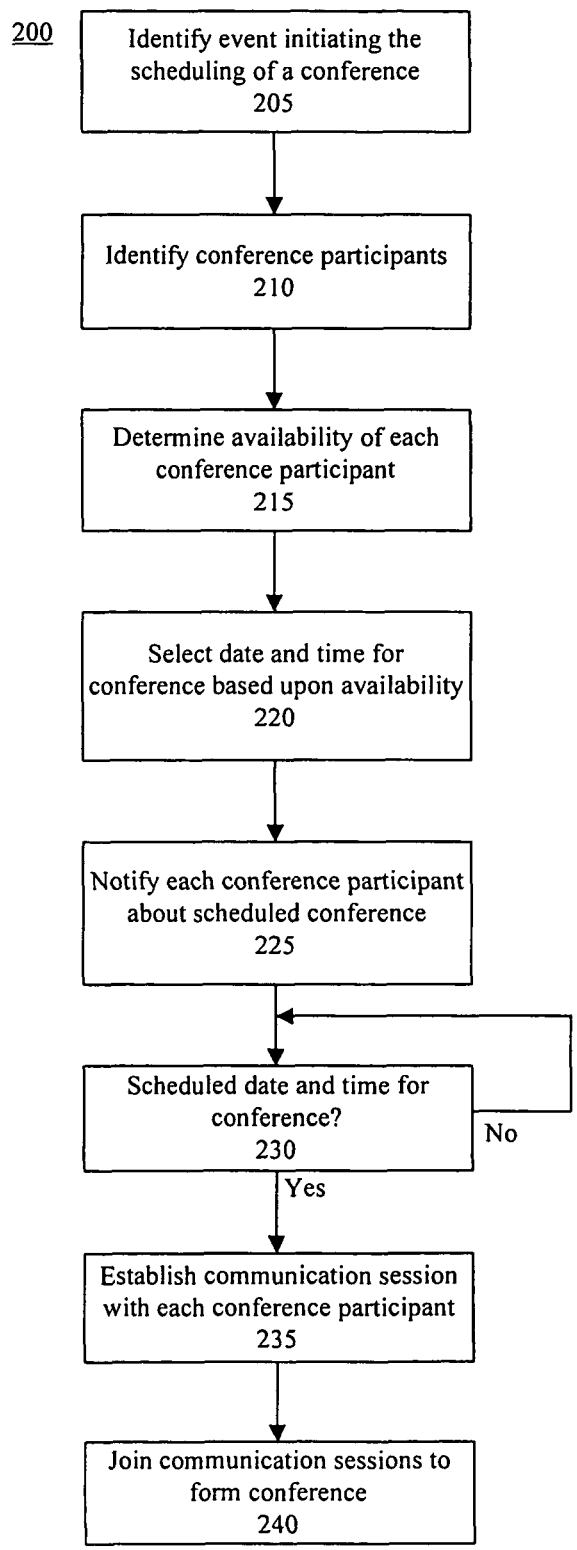
FIG. 2 is a flow chart illustrating a method of scheduling and establishing a conference in accordance with another embodiment of the present invention.

FIG. 2 is a flow chart illustrating a method 200 of scheduling and establishing a conference in accordance with another embodiment of the present invention. Method 200 can, for example, be implemented using the system illustrated in FIG. 1. The method can begin in step 205 where an event which initiates the scheduling of a conference is detected or received by the INS. In one embodiment, the event can be a user requesting a conference to be scheduled through appropriate business logic or a calendar system client. In that case, the request can specify the conference participants.

In another embodiment, the event can be the addition, synchronization, or modification of an electronic document to a data store. In that case, the business logic and/or the synchronization service can post an event to the INS. This can cause the INS to send notifications to the users subscribed to that event and/or initiate a communication session with the users.

In illustration, when a user posts a document, such as a quarterly report, to a data store, business logic or the synchronization service can be configured to post an event to the INS. The event can specify multiple attributes of the posted document, such as the author, the title, the location to which the document was posted within the data store, or the like. Subscriptions for the event can be reserved for users belonging to a common workgroup, unit, or division within the business organization as the case may be. Each user subscribed to the event can receive a notification of the posted report, whether via electronic mail, instant message, automated voice mail, SMS, or some other communication channel. Further, the INS can schedule a conference among the users. The particular communication channel used to send the notification can be selected according to a notification policy established in the system. The notification policy can specify which form of notification, or communication channel, to use for notifying users based upon the context information available for that user when sending the notification.

In step 210, the conference participants can be identified. As noted, if the conference was requested by a user, the request can specify the conference participants. If the conference was initiated automatically responsive to a business event, the participants can be specified within a profile or rule set corresponding to the business event. If, for example, the business event is posted to the INS, the conference participants can be those users that are subscribed to the event.

In step 215, the availability of each of the conference participants can be determined based upon context information. In one embodiment, availability can be determined using calendar information. More particularly, a context service of the INS can access the calendar information for each conference participant from the calendar system. The context service can determine dates and times that each conference participant is available, or is not scheduled for another meeting as indicated by the calendar data for each participant.

In another embodiment, the INS can contact one or more of the conference participants via a selected messaging system. The INS can cause the voice response system to call a conference participant. When the participant answers, the voice response system can query the participant for an acceptable time for the conference. In this embodiment, a dialog can be conducted where availability is determined based upon one or more voice and/or DTMF responses from the participant.

While this embodiment is described with reference to a telephony session, it should be appreciated that other communication channels can be used in lieu of telephony. For example, in another embodiment, the INS can cause an SMS or IM system to query the participant(s). In that case, querying is performed by sending messages to the participant and parsing the participant response rather than processing speech input or DTMF input. Electronic mail also can be used, although electronic mail does not provide a real time querying capability as does telephony, SMS, or IM.

In a further aspect of the present invention, the particular communication channel over which the conference participant is queried can be selected based upon available context information for the conference participant. For example, presence of the conference participant on each respective communication channel can be used. A context service of the INS can query presence servers for a plurality of communication systems such as electronic mail, IM, SMS, IP telephony, and the like, to determine whether the conference participant is logged into any one of the communication systems. The INS can select a communication system on which presence of the conference participant is detected. Accordingly, the INS can cause that communication system to establish a communication session with the participant to begin the dialog and/or query process to determine availability.

As noted, the selection of a particular communication channel can be dictated by the notification policy. This policy can include rules for addressing conflicting instances of context information and prioritize various sources of the context information. For example, the policy can specify that if a participant's calendar indicates that the participant is not available via IM, but the participant has a presence on the IM system, then the participant can be queried via IM despite the calendar indicating unavailability. In another example, a more complex policy or profile can be established which states that the notification is to be a call to the user's mobile phone, in which case a message is read via text-to-speech technology, unless the user has a presence on an IM system, in which case an IM notification message is sent, otherwise an electronic mail notification is sent to the user.

In step 220, based upon the availabilities of the conference participants, the context service can select an appropriate date and time for the conference. As noted, the date and time can be selected such that no conference participant has another appointment which conflicts with the conference date and time. In step 225, the INS can begin notifying the conference participants of the scheduled conference. Responsive to instructions from the INS, selected communication systems can begin distributing notifications to the conference participants.

In one embodiment, the particular communication channel over which the notification is sent can be selected according to the notification policy which interprets available context information for each conference participant. The selection of a communication channel can be made on a per participant basis. For example, the notification(s) can be sent based upon where the participant is expected to be located based upon the schedule of the participant as specified in the calendar system. In another embodiment, the INS can communicate with a location tracking system to determine a location of the participant and select the communication channel based upon the location of the participant.

In yet another embodiment, the INS can be configured to make an entry corresponding to the conference within the schedule of one or more, or each, conference participant. In this manner, the conference participants can be notified through the addition of the calendar entry. Still, it should be appreciated that the communication channel over which the notification is sent can be selected using any combination of the techniques disclosed herein and that conference participants can be notified using any combination of the techniques described herein.

The particular type of conference to be conducted can be selected automatically, for example, using a policy associated with the event that caused the conference to be scheduled. In another embodiment, the type of conference, i.e. whether IM, videoconference, conference call, Web-conference, etc., can be selected by the user that requested or initiated the conference. In any case, the notification can inform the participants of the type of conference to be held.

In step 230, the INS can begin monitoring for the date and time of the conference. If it is determined that the current date and time correspond to the date and time of the conference, the method can proceed to step 235. In step 235, the INS can instruct the appropriate messaging system to begin establishing communication sessions with each individual conference participant. It should be appreciated that the INS can begin the process of initiating real time or near-real time communication sessions with the conference participants at or about the time of the conference and that such action can begin slightly before, after, or at the appointed time.

In an embodiment where the conference is a conference call, the telephony system, working in cooperation with the voice response system, can place outgoing calls to each conference participant. A similar process can be performed whether the conference is to take place as a multi-party IM session, a videoconference, or the like. In any case, the various communication sessions can be joined to the establish the conference in step 240.

In another embodiment, where the conference is to be implemented as a Web-based conference, the INS can begin sending notifications on the date of the conference and at about the time of the scheduled conference. The notifications can be sent to each conference participant. For example, in one embodiment, the notifications can be sent at a predetermined time prior to the time of the conference. In any case, the notifications can be sent via a communication channel selected according to the context information available for each conference participant or using predetermined communication channels as may be established via a notification policy. The selection of a particular communication channel further can be made on a per participant basis, such that one participant is notified via one communication channel and a second participant is notified via a different communication channel. After being notified, each participant can log into the Web-based conference. If so desired, the notification can provide a link to the conference along with any required login information such as passwords. If the notification is via the telephone, such information can be provided in the form of audible prompts.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of automatically conducting a conference comprising:
   responsive to updating a data store, generating an event indicating an update to the data store has occurred in relation to at least one document within the data store;
   responsive detecting the event, identifying each user of a plurality of users subscribed to the event as a conference participant;
   determining availability for each of the plurality of conference participants;
   selecting a date and time for the conference based upon the availability of each of the plurality of conference participants; and
   automatically initiating the conference among the conference participants on the date and at the time corresponding to the conference.

2. The method of claim 1, said step of automatically initiating further comprising:
   establishing a communication session with each conference participant; and
   joining each communication session to form the conference.

3. The method of claim 1, said step of automatically initiating the conference further comprising sending a notification to each conference participant as a reminder of the conference.

4. The method of claim 3, wherein a communication channel over which the notification is sent for at least one conference participant is selected based upon context information for the at least one conference participant.

5. The method of claim 1, further comprising notifying each of the plurality of conference participants of the date and time of the conference via a selected communication channel.

6. The method of claim 1, further comprising placing an entry in an electronic calendar associated with at least one of the plurality of conference participants, wherein each entry indicates the date and time of the conference.

7. The method of claim 1, said step of determining availability further comprising reading scheduling information from an electronic calendar for each of the plurality of conference participants to determine a date and a time when each of the plurality of conference participants is available.

8. The method of claim 1, said step of determining availability further comprising:
    establishing a communication session with at least one of the plurality of conference participants over a communication channel;
    conducting a dialog regarding availability with the at least one of the plurality of conference participants through the communication session; and
    determining availability of the at least one of the plurality of conference participants based upon a response from the at least one of the plurality of conference participants received over the communication channel during the communication session.

9. The method of claim 8, further comprising selecting the communication channel from a plurality of communication channels according to context information for the at least one of the plurality of conference participants.

10. A method of automatically conducting a conference comprising:
    responsive to updating a data store, generating an event indicating an update to the data store has occurred in relation to at least one document within the data store;
    responsive detecting the event, identifying each user of a plurality of users subscribed to the event as a conference participant;
    determining availability for each of the plurality of conference participants;
    selecting a date and time for the conference based upon the availability of each of the plurality of conference participants;
    on the date and at the time corresponding to the conference, automatically establishing a communication session with each of the plurality of conference participants; and
    joining each individual communication session to form the conference.

11. The method of claim 10, further comprising notifying each of the plurality of conference participants of the date and time of the conference via a communication channel selected from a plurality of communication channels according to context information for each conference participant.

12. The method of claim 11, further comprising placing an entry in an electronic calendar associated with at least one of the plurality of conference participants, wherein each entry indicates the date and time of the conference.

13. The method of claim 11, said step of determining availability further comprising reading scheduling information from an electronic calendar for each of the plurality of conference participants to determine a date and a time when each of the plurality of conference participants is available.

14. The method of claim 11, said step of determining availability further comprising:
    establishing a communication session with at least one of the plurality of conference participants over a communication channel;
    conducting a dialog regarding availability with the at least one of the plurality of conference participants through the communication session; and
    determining availability of the at least one of the plurality of conference participants based upon a response from the at least one of the plurality of conference participants received over the communication channel during the communication session.

15. The method of claim 14, further comprising selecting the communication channel from a plurality of communication channels according to context information for the at least one of the plurality of conference participants.

16. A machine readable storage device, having stored thereon a computer program having a plurality of code sections executable by a machine for causing the machine to perform the steps of:
    responsive to updating a data store, generating an event indicating an update to the data store has occurred in relation to at least one document within the data store;
    responsive detecting the event, identifying each user of a plurality of users subscribed to the event as a conference participant;
    determining availability for each of the plurality of conference participants; selecting a date and time for the conference based upon the availability of each of the plurality of conference participants; and
    automatically initiating the conference among the conference participants on the date and at approximately the time corresponding to the conference.

17. The machine readable storage device of claim 16, said step of automatically initiating further comprising:
    establishing a communication session with each conference participant; and joining each communication session into the conference.

18. The machine readable storage device of claim 16, said step of automatically initiating the conference further comprising sending a notification to each conference participant as a reminder of the conference.

19. The machine readable storage device of claim 16, said step of determining availability further comprising reading scheduling information from an electronic calendar for each of the plurality of conference participants to determine a date and a time when each of the plurality of conference participants is available.

20. The machine readable storage device of claim 16, said step of determining availability further comprising:
    establishing a communication session with at least one of the plurality of conference participants over a communication channel;
    conducting a dialog regarding availability with the at least one of the plurality of conference participants through the communication session; and
    determining availability of the at least one of the plurality of conference participants based upon a response from the at least one of the plurality of conference participants received over the communication channel during the communication session.

* * * * *